(12) United States Patent
Martinez et al.

(10) Patent No.: US 11,118,650 B2
(45) Date of Patent: Sep. 14, 2021

(54) BREAK-AWAY TRANSMISSION MOUNT

(71) Applicants: Michael J Martinez, Lake Orion, MI (US); Devon J Trombley, Lenox, MI (US); Brian D Dwyer, Ortonville, MI (US); Maathew Kamps, Grand Rapids, MI (US); Mitchell G Marozzi, Auburn Hills, MI (US)

(72) Inventors: Michael J Martinez, Lake Orion, MI (US); Devon J Trombley, Lenox, MI (US); Brian D Dwyer, Ortonville, MI (US); Maathew Kamps, Grand Rapids, MI (US); Mitchell G Marozzi, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 56 days.

(21) Appl. No.: 16/778,944

(22) Filed: Jan. 31, 2020

(65) Prior Publication Data
US 2021/0239181 A1    Aug. 5, 2021

(51) Int. Cl.
*B60K 17/00* (2006.01)
*F16F 15/04* (2006.01)

(52) U.S. Cl.
CPC .............. *F16F 15/04* (2013.01); *B60K 17/00* (2013.01)

(58) Field of Classification Search
CPC combination set(s) only.
See application file for complete search history.

(56) References Cited

U.S. PATENT DOCUMENTS

| | | | |
|---|---|---|---|
| 3,869,017 A | 3/1975 | Feustel et al. | |
| 5,251,865 A | 10/1993 | Kelly | |
| 9,120,372 B2* | 9/2015 | Sloan | B60K 15/07 |
| 9,457,652 B2* | 10/2016 | Sloan | B60K 15/067 |
| 9,739,337 B2* | 8/2017 | Hayashi | F16F 15/08 |
| 10,066,552 B2* | 9/2018 | Jiang | F16H 57/028 |
| 10,576,813 B2* | 3/2020 | Avina Flores | F16F 7/10 |
| 2006/0264151 A1* | 11/2006 | Byers | B60G 15/067 446/469 |
| 2009/0008177 A1* | 1/2009 | Sheahan | B62J 35/00 180/225 |
| 2009/0066048 A1* | 3/2009 | Mayenburg | B60G 11/465 280/124.11 |
| 2013/0042630 A1* | 2/2013 | Muldoon | F02C 7/32 60/796 |
| 2014/0175783 A1* | 6/2014 | Sloan | B60K 15/067 280/834 |
| 2017/0260907 A1* | 9/2017 | Jiang | F16H 57/025 |
| 2018/0370643 A1* | 12/2018 | Shahosseini | F16F 1/3713 |

* cited by examiner

*Primary Examiner* — Monica E Millner
(74) *Attorney, Agent, or Firm* — Ralph E Smith

(57) ABSTRACT

A mount to couple a transmission to a vehicle body includes a first body with at least one first body connector, and a second body with at least one coupler connected to the first body and which includes a damping material arranged to damp vibrations between the first body and second body. A retainer is carried by the first body and has a portion that overlaps part of the second body to prevent separation of the second body from the first body in a first state of the retainer. The retainer is broken or removed from the first body in a second state to permit separation of the second body from the first body, and the retainer breaks or is removed from the first body under a force less than the force needed to break or remove the at least one first body connector from the vehicle body.

20 Claims, 5 Drawing Sheets

BREAK-AWAY TRANSMISSION MOUNT

FIELD

The present disclosure relates to a transmission mount.

BACKGROUND

Vehicle transmissions are mounted to a vehicle by several mounts. The mounts may include vibration damping material and a plurality of solid, one-piece fasteners are used to couple the mounts to the vehicle. In the event of a vehicle collision, it may be desirable for the mount and/or at last some of the fasteners to break to permit relative movement between the vehicle body/frame and the transmission.

SUMMARY

In at least some implementations, a mount to couple a transmission to a vehicle body includes a first body, a second body and a retainer. The first body has at least one first body connector adapted to be coupled to the vehicle body to retain the first body relative to the vehicle body. The second body has at least one coupler that is connected to the first body and includes a damping material arranged to damp vibrations between the first body and second body. And the retainer is carried by the first body and has a portion that overlaps part of the second body to prevent separation of the second body from the first body in a first state of the retainer. The retainer is broken or removed from the first body in a second state to permit separation of the second body from the first body, and the retainer breaks or is removed from the first body under a force less than the force needed to break or remove the at least one first body connector from the vehicle body.

In at least some implementations, the retainer includes a main body coupled to the first body and wherein the portion that overlaps part of the second body is defined by a flange extending outwardly from the main body. The flange may be defined by a washer and the main body may include a fastener having a head that overlies part of the washer and a threaded shank that extends through an opening in the washer and is coupled to the first body.

In at least some implementations, the retainer includes a threaded shank and the first body includes a threaded bore in which the threaded shank is received. The threaded bore may be a blind bore, that is, a bore that does not extend fully through the first body. In at least some implementations, multiple first body connectors are provided and the retainer is coaxial with one of the first body connectors.

In at least some implementations, the first body includes a first end with a first one of the at least one first body connectors coupled to the first body at the first end, the first body includes a second end with a second one of the at least one first body connectors coupled the first body at the second end, and with a third one of the at least one first body connectors located between the first end and the second end. The at least one coupler may include a first coupler connected to the first body adjacent to the first end and a second coupler connected to the first body adjacent to the second end and wherein the retainer is located between the first coupler and second coupler.

In at least some implementations, the first body includes two opposed side surfaces and the at least one coupler includes a body formed over the opposed side surfaces and clamping the coupler to the first body to resist separation of the second body from the first body. The damping material may be provided between the coupler body and the first body. The first coupler may include a body formed over opposed side surfaces of a portion of the first body closer to the first end than to the second end, and the second coupler may include a body formed over opposed side surfaces of a portion of the first body closer to the second end than to the first end.

In at least some implementations, the retainer breaks or is removed from the first body under a force greater than the force needed to separate the at least one coupler from the first body.

In at least some implementations, a mount to couple a transmission to a vehicle body includes a first body, a second body and a retainer. The first body is adapted to be coupled to the vehicle body. The second body has multiple couplers that are mechanically connected to the first body without an adhesive or chemical bond between them, and the couplers include a damping material arranged to damp vibrations between the first body and second body. The retainer is secured to the first body and has a portion that overlaps part of the second body to permit limited relative movement between the second body and the first body and to prevent separation of the second body from the first body in a first state of the retainer. The retainer is broken or removed from the first body in a second state to permit separation of the second body from the first body, and the retainer breaks or is removed from the first body under a force greater than the force needed to separate the couplers from the first body.

In at least some implementations, one or more first body connectors are adapted to connect the first body to the vehicle body and the retainer breaks or is removed from the first body under a force less than the force needed to break the first body connectors or separate the first body connectors from the vehicle body. The retainer may be separate from each of the first body connectors.

In at least some implementations, the couplers include a coupler body that is pressed onto the first body. Spaced apart portions of the coupler may be bent around portions of the first body. The coupler body may be bonded to or embedded in the damping material of the second body.

In at least some implementations, the first body includes a threaded opening and the retainer includes a threaded portion received in the threaded opening. One or more second body connectors may be provided that are adapted to connect the second body to the transmission and the retainer breaks or is removed from the first body under a force less than the force needed to break the second body connectors or separate the second body connectors from the transmission.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
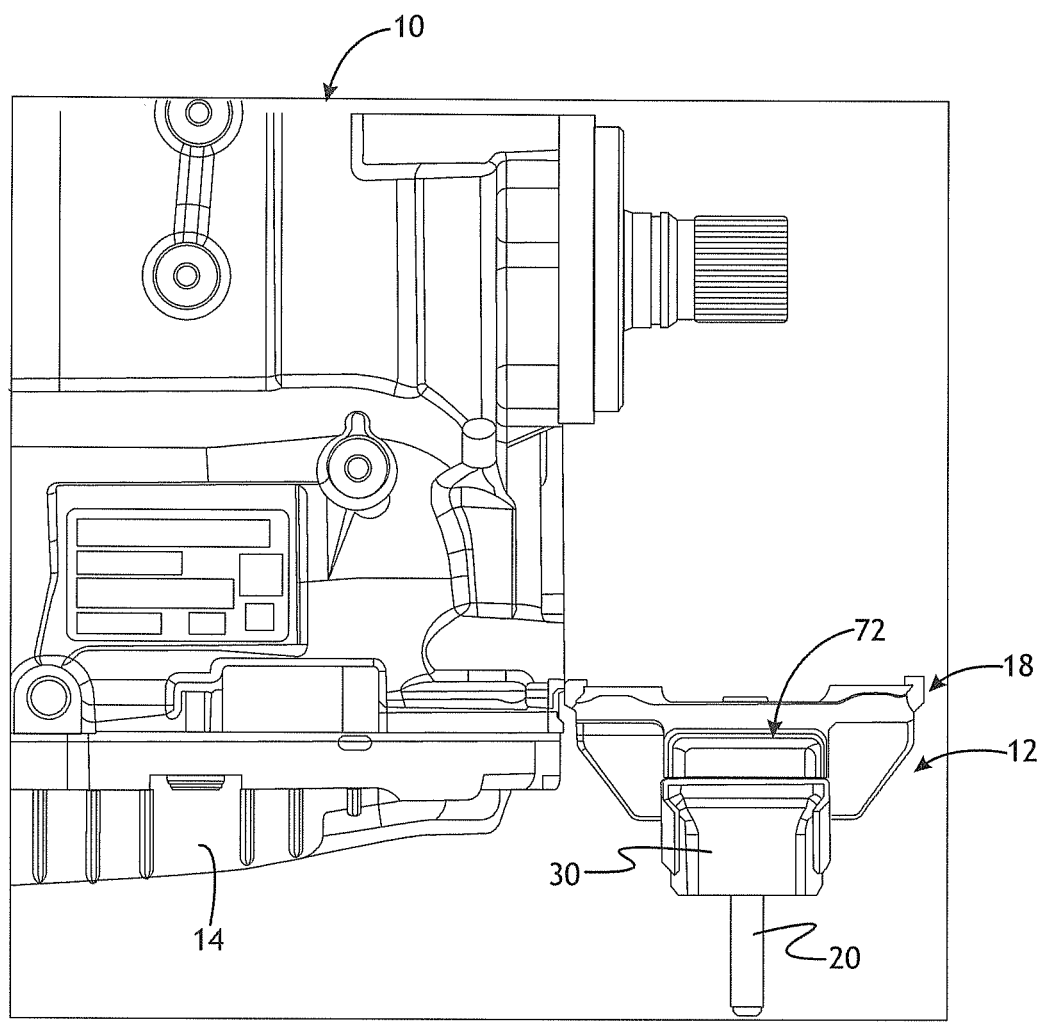
FIG. 1 is a front view showing a portion of a transmission and a transmission mount.
Figure 2:
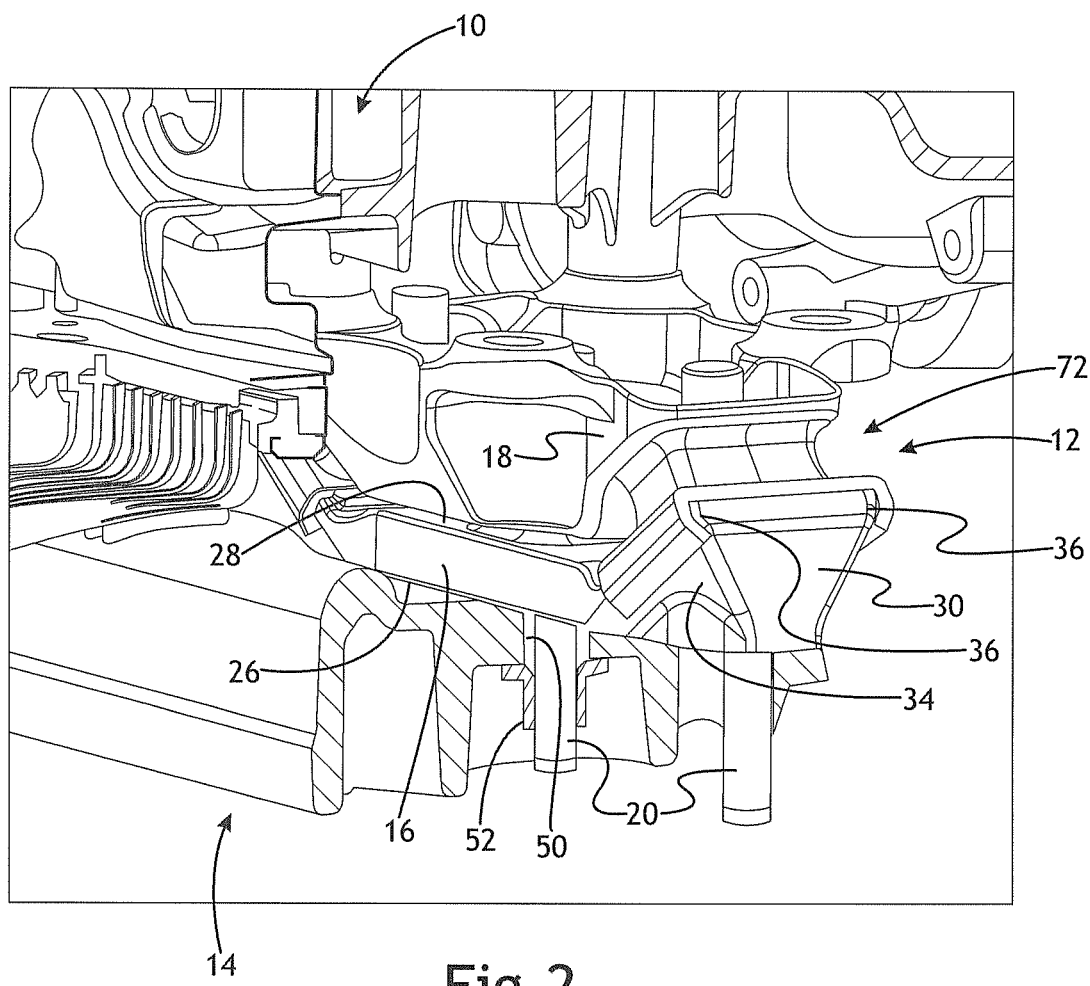
FIG. 2 is a perspective sectional view showing the transmission mount in relation to a portion of the transmission.

Referring in more detail to the drawings, FIGS. 1 and 2 illustrate a portion of a vehicle transmission 10 and a mount 12 used to couple the transmission 10 to a vehicle structural component, generally referred to herein as the vehicle body 14. The structural component may include an engine cradle or a rail or different structural member of the vehicle, as desired. More than one mount 12 is used to secure the transmission 10 relative to the vehicle and the mounts 12 may be spaced apart about the transmission 10 as desired. The mounts 12 may be constructed in the same manner such that only one mount 12 will be described in detail herein.

Figure 3:
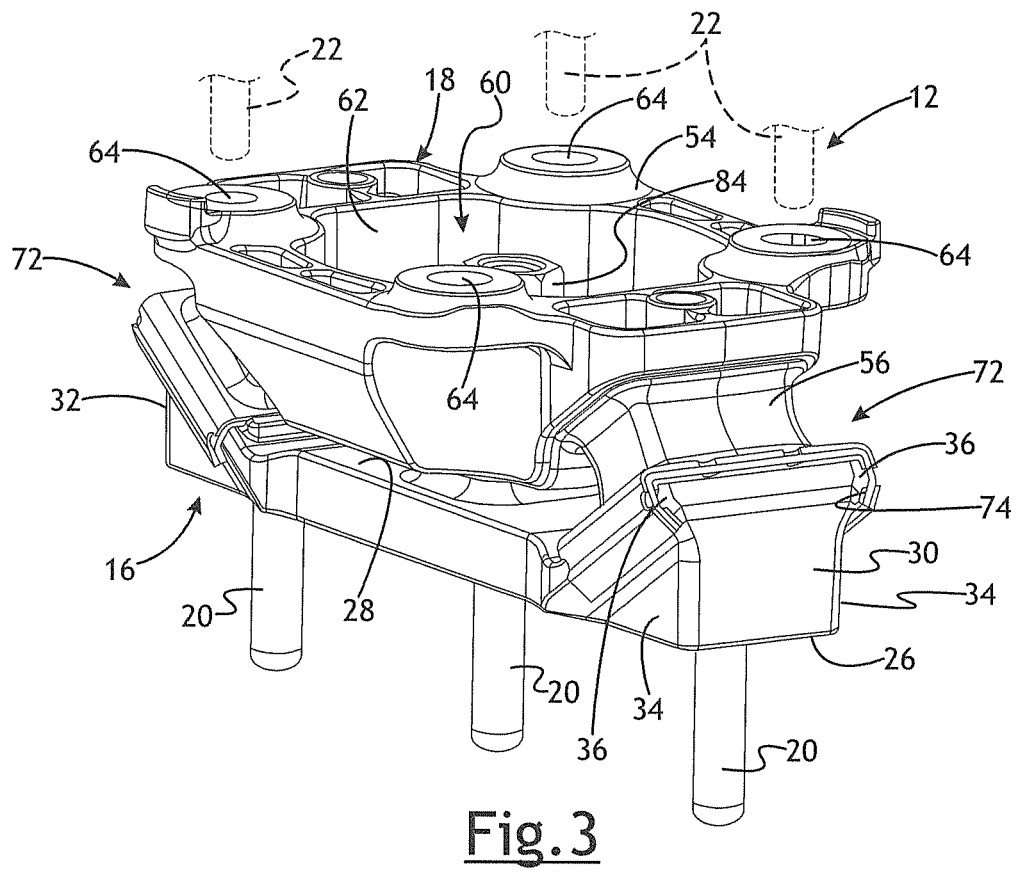
FIG. 3 is a perspective view of the mount.
Figure 5:
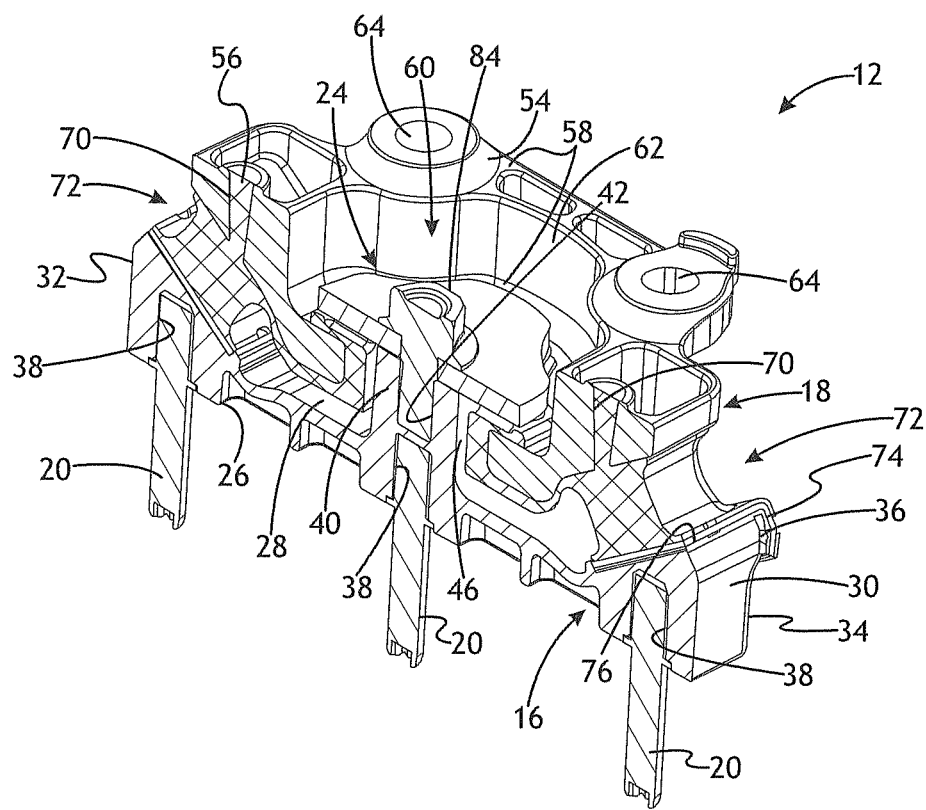
FIG. 5 is a perspective sectional view of the mount taken along line 5-5 in FIG. 4.
Figure 6:
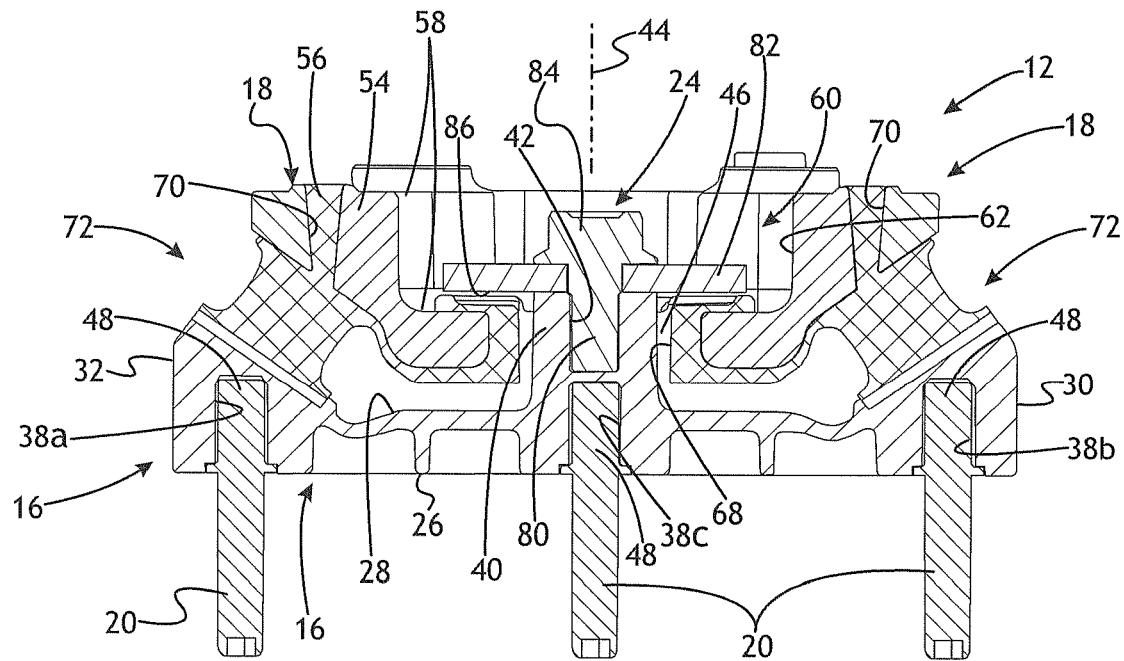
FIG. 6 is a sectional view of the mount taken along line 5-5 in FIG. 4.

The mount 12 includes a first body 16, a second body 18 coupled to the first body 16, first body connectors 20 that connect the first body 16 to the vehicle body 14, second body connectors 22 (FIG. 3) that connect the transmission 10 to the second body 18, and a retainer 24 that retains the second body 18 relative to the first body 16. The first body 16 may be formed of metal, such as steel or aluminum, or other rigid and strong material or materials and is adapted to be securely fastened to the vehicle body 14 by one or more of the first body connectors 20. As shown in FIGS. 3, 5 and 6, the first body 16 may include a lower surface 26 arranged to engage the portion of the vehicle body 14 to which the first body 16 is attached, an upper surface 28 opposite the lower surface 26, a first end 30 and a second end 32. The first and second ends 30, 32 of the first body 16 may include side surfaces 34 on opposite sides of a portion of the upper surface 28. The distance between the side surfaces 34 may be greater at the upper surface 28 than at a location spaced from the upper surface 28, or the first and second ends 30, 32 may otherwise include a wider portion and a narrower portion spaced farther from the upper surface 28 than the wider portion. This provides a shoulder 36 facing generally away from the upper surface 28 and toward the lower surface 26, where the shoulder 36 may be parallel to the upper surface 28 at the first end 30 or within 45 degrees of parallel.

To receive part of the first body connectors 20, an opening 38 is provided in the body for each first body 16 connector and the openings 38 are open through the lower surface 26, as shown for example in FIGS. 5 and 6. The openings 38 could extend through the upper surface 28 as well, but in the implementation shown, the openings 38 are defined in blind bores, that is, the openings 38 terminate within the first body 16 and do not extend therethrough. To distribute forces across the first body 16, a first opening 38a may be provided adjacent to the first end 30, a second opening 38b may be provided adjacent to the second end 32, and a third opening 38c may be provided between the first and second openings 38a, 38b. In at least some implementations, the third opening 38c is centrally located in the first body 16. Fewer or more than three openings 38 may be provided, as desired, and the openings 38 may be arranged as desired.

Figure 7:
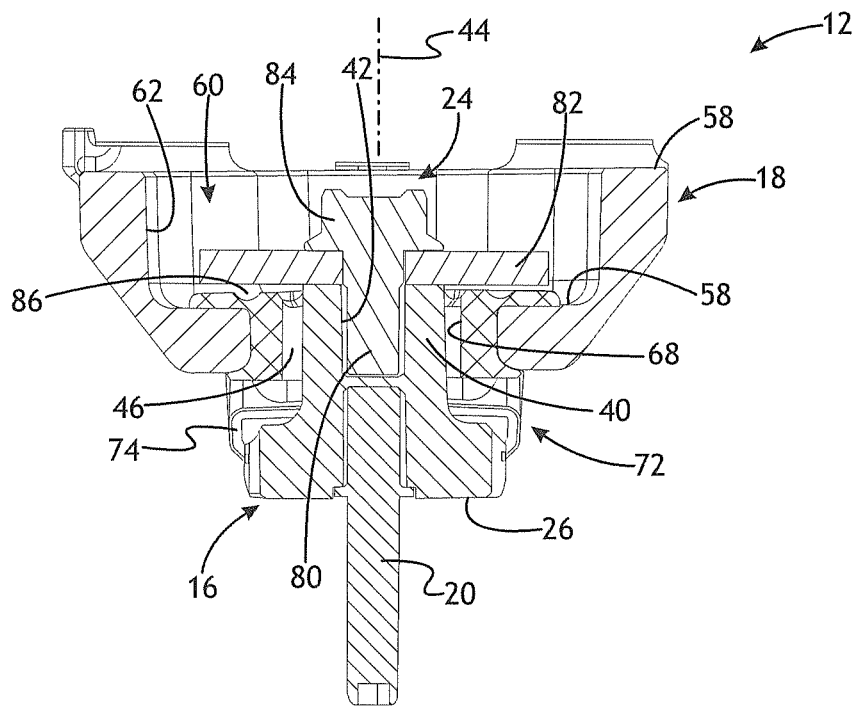
FIG. 7 is a sectional view of the mount taken along line 7-7 in FIG. 4.
Figure 8:
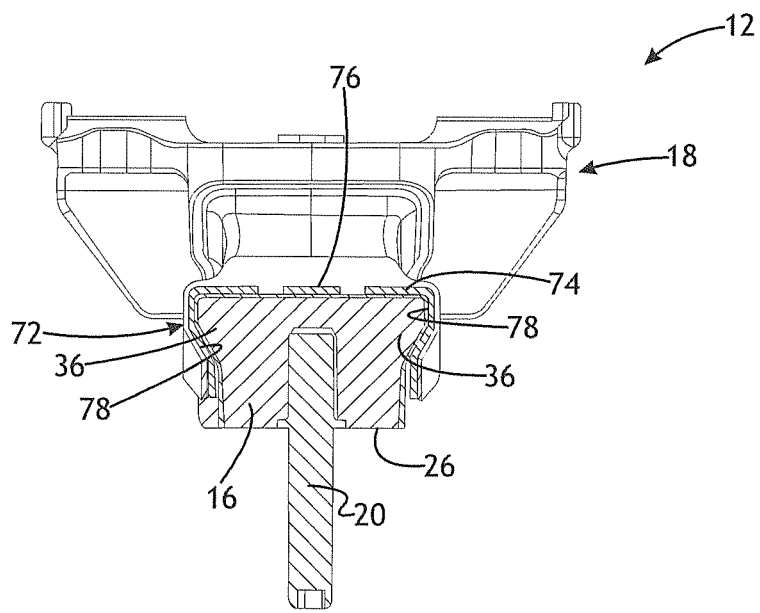
FIG. 8 is a sectional view of the mount taken generally along line 8-8 of FIG. 4.

To receive the retainer 24, the first body 16 may include a boss 40 (e.g. a projection) that extends outwardly relative to the adjacent portion of the upper surface 28. The boss 40 defines an opening 42 in the upper surface 28 in which part of the retainer 24 is received. The opening 42 may have an axis 44 and extend through the first body 16 (e.g. also through the lower surface 26) but in at least some implementations, the opening 42 is defined by a blind bore, that is, the opening 42 terminates within the first body 16 and does not extend therethrough. The boss 40 may be located between the ends 30, 32 of the first body 16, and in at least some implementations, the boss 40 may be centrally located in the first body 16. In that regard, the opening 42 in the boss 40 may be coaxial with the third opening 38c (labeled with a, b and c in FIG. 6). In at least some implementations, an open space 46 (FIGS. 5, 6 and 7) is provided radially outwardly of and circumferentially around the exterior of the boss 40, and a portion of the second body 18 surrounds the boss 40, as will be described in more detail below.

The first body connectors 20 may include a threaded portion 48 (FIG. 6) at or adjacent to one end that is received within the openings 38, which may correspondingly be threaded. The other end of the connectors 20 may extend outwardly from the first body 16 and be received through openings 50 (FIG. 2) in the vehicle body 14 and be secured in place with a nut 52 (FIG. 2) or otherwise, as desired. The connectors 20 may be formed of a high strength material, such as steel.

Figure 4:
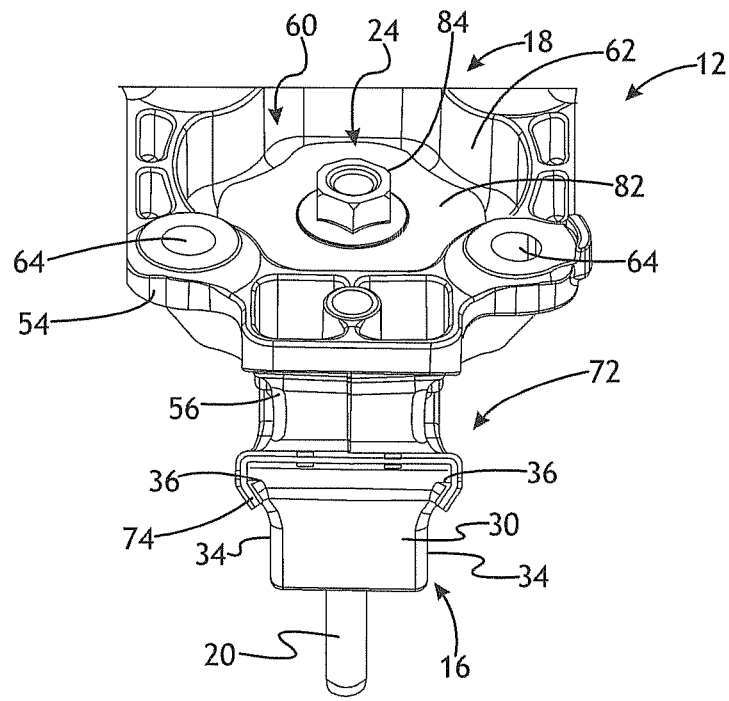
FIG. 4 is a different perspective view of the mount.

The second body 18 may include a first portion 54 formed of a high strength material, such as aluminum or steel, and may also include a second portion 56 that includes or is formed of a damping material, such as an elastomer. The first portion 54 includes an upper surface 58 that may be defined in part within a cavity 60 defined by or within a sidewall 62 and also along the top or outer surface of the sidewall 62. The upper surface 58 may include one or more openings 64 (FIGS. 3-5) adapted to receive second body connectors 22 that couple the second portion 56 to a housing of the transmission 10. The openings 64 may be defined in bores that may be blind or that may extend through the second portion 56 of the second body 18, as desired. The upper surface 58 includes an opening 68 therethrough in which the boss 40 of the first body 16 is received. In at least some implementations, the boss 40 is received through the upper surface 58 of the second body 18 and an axially outer surface the boss 40 (relative to an axis 44 of the boss 40 and/or its opening 42) is spaced from the adjacent portion of the upper surface 58 of the second body 18.

The second portion 56 of the second body 18 connects the second body 18 to the first body 16, and permits limited relative movement of the second body 18 relative to the first body 16. Thus, the second portion 56 may be formed of a flexible and resilient material having sufficient strength to support the transmission 10 via the first portion 54 and maintain the position of the transmission 10 relative to the first body 16. In at least some implementations, the second portion 56 may be formed of an elastomer and may be reinforced by other materials as desired to achieve a desired strength. The elastomeric material may also damp vibrations between the first body 16 and the first portion 54 of the second body 18. The second portion 56 may be integrally formed on or with the first portion 54, such as by overmolding the second portion 56 to the first portion 54, or the second portion 56 may be adhered, bonded and/or connected by mechanical fasteners to the first portion 54, as desired. To facilitate a robust connection between the first portion 54 and second portion 56, the first portion 54 may include one or more voids 70 (FIGS. 5 and 6) or passages in or through which parts of the second portion 56 may be received. In at least some implementations, the second portion 56 overlies portions of the first portion 54 that may engage the first body 16 in use of the mount 12 (e.g. as the second body 18 moves relative to the first body 16). In the example shown, the second portion 56 overlies part (up to all) of the upper surface 58 of the first portion 54 within the cavity 60, and may also overlie the surface that defines the opening 68 adjacent to the boss 40, as well as the lower surface of the first portion 54.

The second body 18 is coupled to the first body 16 at one or more locations spaced from the boss 40, and between the locations of connection, at least part of the second portion 56 is spaced from the first body 16 to permit relative movement of the second portion 56 relative to the first body 16. In at least some implementations, the second body 18 is coupled to the first body 16 at more than one location, with the example shown including two locations at or near the ends 30, 32 of the first body 16, with the boss 40 between the locations of connection. The connection may be made in any desired way, to enable the second body 18 to remain coupled to the first body 16 until a threshold force is experienced at the mount 12, in which case, the second body 18 may separate from the first body 16, as will be described in more detail below.

In at least some implementations, the second body 18 includes couplers 72 that are secured to the first body 16. The couplers 72 may be carried by the second portion 56 of the second body 18 and may be spaced from the lower surface 26 of the first portion 54 so that the second portion 56 is at least partially located between and separates the first body 16 and first portion 54 of the second body 18. In the example shown, the couplers 72 include a rigid body 74 carried by the second portion 56 and which is secured to the first body 16, such as by forming the coupler body 74 around part of the first body 16. The coupler bodies 74 may be formed of metal and may be in the form of a thin plate that may be bent or crimped, for example. In the example shown, each coupler body 74 is generally U-shaped with a base 76 overlying a respective end of the first body 16 and two sides 78 that overlie the opposite side surfaces 34 of the respective ends 30, 32 of first body 16 and may be formed around the shoulder 36. So arranged, a first coupler 72 is connected to or near the first end 30 of the first body 16 and a second coupler 72 is connected to or near a second end 32 of the first body 16 (where near means between the boss 40 and the indicated end). The sides 78 may have a friction or interference fit with the first body 16, such as by being press fit onto the first body 16 or formed around the first body 16 such that the coupler body 74 is clamped to the first body 16 (e.g. by crimping or bending the sides to the first body 16). To damp vibrations between the coupler body 74 and the first body 16, a damping material may be provided between them, and that material may be part of the second portion 56 of the second body 18, if desired. In at least some implementations, the coupler body 74 is overmolded by the second portion 56 of the second body 18 (i.e. the coupler body 74 may be an insert around which the material of the second body 18 is molded during formation of the second body 18).

To further retain the second body 18 relative to the first body 16, the retainer 24 may be coupled to the first body 16 and have a portion that overlies part of the second body 18 to inhibit separation of the second body 18 from the first body 16. The retainer 24 may have a main body defined by a shank 80 received within the opening 42 in the boss 40, which may have complementary threads to facilitate assembly and retention of the retainer 24 to first body 16. The retainer 24 may also include an outwardly extending flange 82 that overlies at least part of the first portion 54 of the second body 18, that is, at least part of the first portion 54 is received axially between the flange 82 and the upper surface 28 of the first body 16 (relative to the axis 44 of the boss 40 and/or retainer 24). In this way, the flange 82 may engage the second body 18 and limit axial movement of the second body 18 away from the first body 16. The flange 82 may be integrally formed with the remainder of the retainer 24, or the flange may be defined by a component separate from the main body of the retainer, such as by a washer having an opening through which the shank 80 extends and which is trapped against the boss by a head 84 of the retainer 24. In at least some implementations, in an at rest or first state of the mount 12 (e.g. without outside forces acting on the mount 12) a space 86 (FIGS. 6 and 7) is provided axially between the flange 82 and the upper surface 58 of the second body 18 so that the second body 18 can move some distance toward the flange 82 without contacting the flange 82. In this way, the flange 82 limits the extent that the second body 18 may move relative to the first body 16 but does not prevent movement of the second body 18 relative to the first body 16. Further, the flange 82 may have a radial peripheral or outer surface that is spaced from the second body 18, for example, a space is provided between the radial outer surface of the flange 82 and the sidewall 62 of the first portion 54 of the second body 18. Further, the opening in the second body 18 may be larger than the outer diameter of the boss 40 providing a radial gap between the second body 18 and the boss 40. The radial gaps between the second body 18 and the boss 40, and the second body 18 and the flange 82, permit some radial movement of the second body 18 relative to the first body 16. The combined radial and axial spacing of the second body 18 from the flange 82 and first body 16 (e.g. the boss 40) also permits tilting of the second body 18 relative to the first body 16 and a large degree of freedom between the first body 16 and second body 18.

The mount 12 may be assembled by attaching the couplers 72 to the first body 16, and by securing the retainer 24 to the first body 16 in a position partially overlapping the second body 18. Thereafter, the mount 12 may be secured to the transmission 10 via the second body connectors 22 that secure the first portion 54 of the second body 18 to the transmission housing or associated brackets/supports. And the mount 12 may be secured to the vehicle body 14 via the first body connectors 20. So arranged, the transmission 10 is somewhat isolated from the first body 16/vehicle body 14 by the second portion 56 of the second body 18, which is flexible and resilient, and by the interconnection of the second body 18 to the first body 16 which permits relative movement between these bodies. In this way, forces and vibrations between the transmission 10 and vehicle body 14 are damped.

The mount 12 is robust so that peak durability and in use forces are managed by the mount 12 without separation of the second body 18 from the first body 16. In at least some implementations, the mount 12 may experience loads up to 7 kN in the fore/aft direction (e.g. extending between front and rear of the vehicle) and up to 4 kN vertically (e.g. axially relative to the boss 40/retainer 24). Thus, the second portion 56 of the second body 18, including the couplers 72, and the retainer 24 remain intact and in position under such loads.

In the event of a vehicle collision, relative high forces may be passed through the vehicle body 14 and to the mount 12. These forces can exceed the loads normally experienced during normal operation of the vehicle. In such a situation, it may be desirable for the first body 16 and second body 18 to separate. Among other things, this may permit the vehicle body 14 to move further relative to the transmission 10 without passing on the very high loads to and through the transmission housing and connected powertrain components (e.g. engine, drive shaft, etc.). Therefore, in at least some implementations, the second body 18 separates from the first body 16 when a threshold force is applied to the mount 12. The threshold force is above the normal operating loads experienced by the mount 12, and in at least some implementations, the threshold force is at least 20% higher than the normal operation loads experienced by the mount 12, and in some implementations the threshold force is 150% more than the maximum normal operating load. In at least some implementations, the first and second bodies do not separate until a load of about 30 kN is applied to the mount 12. That is, the mount 12 absorbs up to about 30 kN of force before the first and second bodies separate. Of course, other values may be used in different implementations, such as a load that is 20% higher than the normally expected maximum operating load on the supports, as noted above.

Separation of the first and second bodies requires both the couplers 72 to separate from the first body 16 and the retainer 24 to separate from the first body 16. In this context, separation may occur by disconnection or breakage of one or more of these components/features. For example, with respect to the retainer 24, the threads on the shank 80 of the retainer 24 or in the boss 40 may fail, or the shank 80 or flange 82 may break under a given load. Similarly, the second portion 56 of the second body 18 may fail (e.g. tear or break) or the coupler bodies 74 may be deformed and pulled off the first body 16. In some implementations, the couplers 72 may separate from the first body 16 under a load that is higher than normal operating loads and lower than what is required to separate the retainer 24 from the first body 16. In at least some implementations, the couplers 72 separate from the first body 16 at a load that is equal to or less than the load at which the retainer 24 separates from the first body 16. In at least some implementations, the couplers 72 separate from the first body 16 at a load that is at least 20% greater than the normal operating loads (i.e. a maximum load for which the part is designed) up to 150% greater than the normal, maximum operating load.

Normal operating loads may be determined via testing to find the maximum loads on the supports when tested either in vehicle or outside of the vehicle (e.g. in bench tests). The forces are derived from the powertrain acceleration relative to the transmission mount multiplied by the mass of the powertrain. These forces are usually specified in their X, Y, Z-axis components, and may vary from one vehicle to another based primarily upon the mass of the transmission used with the vehicle.

The force at which the retainer 24 fails or separates from the first body 16 may be independent from the force at which failure occurs of the first body 16 connector aligned with the retainer 24. In at least some implementations, the first body connectors 20 resist separation of the first body 16 from the vehicle body 14 under loads at least as great as the load needed to separate the second body 18 from the first body 16. With the connection between the first body 16 and second body 18 being separate from the first body 16 connector that connect the first body 16 to the vehicle body 14 greater control may be enabled over the separation of the first and second bodies. In prior designs, a connector both provided the function of the retainer 24 and also was a point of connection of the first body 16/mount 12 to the vehicle body 14. Separation of the second body 18 from the first body 16 then required breaking a connection between the first body 16 and vehicle, which is not required in the mount 12 described herein. Further, in some prior mounts 12, the flexible portion of the second body 18 was bonded to both the second body 18 and the first body 16, and hence, separation of the bodies required breaking multiple locations of the bonded surfaces which can occur at different loads depending upon the quality or extent of the bonding at a location. In the implementations shown herein, the couplers 72 and coupling bodies 74 are bonded to the second body 18 and are mechanically coupled to the first body 16 and are not adhered or bonded to the first body 16. The mechanical connection can be separated in a tighter range of forces as, for example, a function of the strength of the coupler body 74 (e.g. material type and thickness) which may be chosen as desired for a particular application.

What is claimed is:

1. A mount to couple a transmission to a vehicle body, comprising:
    a first body having at least one first body connector adapted to be coupled to the vehicle body to retain the first body relative to the vehicle body;
    a second body having at least one coupler that is connected to the first body and which includes a damping material arranged to damp vibrations between the first body and second body;
    and a retainer carried by the first body and having a portion that overlaps part of the second body to prevent separation of the second body from the first body in a first state of the retainer, and wherein the retainer is broken or removed from the first body in a second state to permit separation of the second body from the first body, and wherein the retainer breaks or is removed from the first body under a force less than the force needed to break or remove the at least one first body connector from the vehicle body.

2. The mount of claim 1, wherein the retainer includes a main body coupled to the first body and wherein the portion that overlaps part of the second body is defined by a flange extending outwardly from the main body.

3. The mount of claim 2 wherein the flange is defined by a washer and the main body includes a fastener having a head that overlies part of the washer and a threaded shank that extends through an opening in the washer and is coupled to the first body.

4. The mount of claim 1 wherein the retainer includes a threaded shank and the first body includes a threaded bore in which the threaded shank is received.

5. The mount of claim 4 wherein the threaded bore is a blind bore.

6. The mount of claim 1 wherein multiple first body connectors are provided and wherein the retainer is coaxial with one of the first body connectors.

7. The mount of claim 1 wherein the first body includes a first end with a first one of the at least one first body connectors coupled to the first body at the first end, the first body includes a second end with a second one of the at least one first body connectors coupled the first body at the second end, and with a third one of the at least one first body connectors located between the first end and the second end.

8. The mount of claim 7 wherein the at least one coupler includes a first coupler connected to the first body adjacent to the first end and a second coupler connected to the first body adjacent to the second end and wherein the retainer is located between the first coupler and second coupler.

9. The mount of claim 1 wherein the first body includes two opposed side surfaces and the at least one coupler includes a body formed over the opposed side surfaces and clamping the coupler to the first body to resist separation of the second body from the first body.

10. The mount of claim 9 wherein the damping material is provided between the coupler body and the first body.

11. The mount of claim 8 wherein the first coupler includes a body formed over opposed side surfaces of a portion of the first body closer to the first end than to the second end, and the second coupler includes a body formed over opposed side surfaces of a portion of the first body closer to the second end than to the first end.

12. The mount of claim 1 wherein the retainer breaks or is removed from the first body under a force greater than the force needed to separate the at least one coupler from the first body.

13. A mount to couple a transmission to a vehicle body, comprising:
a first body adapted to be coupled to the vehicle body;
a second body having multiple couplers that are mechanically connected to the first body without an adhesive or chemical bond between them, and wherein the couplers include a damping material arranged to damp vibrations between the first body and second body; and
a retainer secured to the first body and having a portion that overlaps part of the second body to permit limited relative movement between the second body and the first body and to prevent separation of the second body from the first body in a first state of the retainer, and wherein the retainer is broken or removed from the first body in a second state to permit separation of the second body from the first body, and wherein the retainer breaks or is removed from the first body under a force greater than the force needed to separate the couplers from the first body.

14. The mount of claim 13 which also includes one or more first body connectors adapted to connect the first body to the vehicle body and wherein the retainer breaks or is removed from the first body under a force less than the force needed to break the first body connectors or separate the first body connectors from the vehicle body.

15. The mount of claim 13 wherein the couplers include a coupler body that is pressed onto the first body.

16. The mount of claim 15 wherein spaced apart portions of the coupler are bent around portions of the first body.

17. The mount of claim 15 wherein the coupler body is bonded to or embedded in the damping material of the second body.

18. The mount of claim 13 wherein the first body includes a threaded opening and the retainer includes a threaded portion received in the threaded opening.

19. The mount of claim 13 which also includes one or more second body connectors adapted to connect the second body to the transmission and wherein the retainer breaks or is removed from the first body under a force less than the force needed to break the second body connectors or separate the second body connectors from the transmission.

20. The mount of claim 14 wherein the retainer is separate from each of the first body connectors.

* * * * *